United States Patent
Papasakellariou et al.

(10) Patent No.: US 9,838,153 B2
(45) Date of Patent: Dec. 5, 2017

(54) MULTIPLEXING CONTROL AND DATA INFORMATION FROM A USER EQUIPMENT

(75) Inventors: Aris Papasakellariou, Houston, TX (US); Young-Bum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 149 days.

(21) Appl. No.: 13/204,107

(22) Filed: Aug. 5, 2011

(65) Prior Publication Data

US 2012/0033648 A1 Feb. 9, 2012

Related U.S. Application Data

(60) Provisional application No. 61/370,995, filed on Aug. 5, 2010.

(51) Int. Cl.
| | | |
|---|---|---|
| *H04L 1/00* | (2006.01) | |
| *H04L 1/06* | (2006.01) | |
| *H04L 1/18* | (2006.01) | |
| *H04L 1/16* | (2006.01) | |

(52) U.S. Cl.
CPC ............ *H04L 1/003* (2013.01); *H04L 1/1607* (2013.01); *H04L 1/1812* (2013.01)

(58) Field of Classification Search
CPC ...... H04L 1/003; H04L 1/1607; H04L 1/1812
See application file for complete search history.

(56) References Cited

U.S. PATENT DOCUMENTS

| | | | |
|---|---|---|---|
| 2009/0213769 A1* | 8/2009 | Shen et al. ............... | 370/280 |
| 2009/0285122 A1 | 11/2009 | Onggosanusl et al. | |
| 2010/0115367 A1* | 5/2010 | Hsu ...................... | H04L 1/189 |
| | | | 714/748 |
| 2010/0192035 A1* | 7/2010 | Sagfors ................ | H04L 1/1819 |
| | | | 714/748 |
| 2011/0310986 A1* | 12/2011 | Heo et al. ................ | 375/259 |
| 2013/0010743 A1* | 1/2013 | Ahn et al. ............... | 370/329 |

(Continued)

FOREIGN PATENT DOCUMENTS

EP 2 139 150 12/2009

OTHER PUBLICATIONS

Huawei, "A/N Transmission in TDD CA", R1-103436, 3GPP TSG WG1 Meeting #61bis, Jun. 28, 2010.

(Continued)

*Primary Examiner* — Walter Divito
(74) *Attorney, Agent, or Firm* — The Farrell Law Firm, P.C.

(57) ABSTRACT

Methods and apparatus are provided for a User Equipment to transmit acknowledgement information together with data information to a base station during a Transmission Time Interval. A number of nominal resources for the transmission of the first set of AIBs is compared to a number of resources available to the UE for transmission of the acknowledgement information. The first set of AIBs is transmitted if the number of nominal resources is less than or equal to the number of available resources. A second set of AIBs is selected from the first set of AIBs and bundling operations are performed over respective distinct subsets of AIBs in the second set of AIBs to obtain a third set of AIBs if the number of nominal resources is greater than the number of available resources. The third set of AIBs and a fourth set of AIBs are transmitted.

16 Claims, 9 Drawing Sheets

(56) References Cited

U.S. PATENT DOCUMENTS

2013/0039307 A1* 2/2013 Han et al. .............. 370/329
2013/0044667 A1* 2/2013 Han et al. .............. 370/311

OTHER PUBLICATIONS

Samsung, "Discussion on ACK/NACK Transmission Method for LTE-A TDD", R1-103640, 3GPP TSG RAN WG1 Meeting #61bis, Jun. 28, 2010.
Nokia et al., "Evaluation of UL ACK/NAK Bundling Ways in LTE-A TDD", R1-103787, 3GPP TSG RAN WG1 Meeting #61bis, Jun. 28, 2010.
Catt, "UL ACK/NACK Transmission Design in TDD with CA", R1-100875, 3GPP TSG RAN WG1 Meeting #60, Feb. 22-26, 2010, 7 pages.
Texas Instruments, "Multiple ACK/NAK Transmission in TDD", R1-082489, 3GPP TSG RAN WG1 #53b, Jun. 30-Jul. 4, 2008, 5 pages.
European Search Report dated Jun. 21, 2017 issued in counterpart application No. 11814793.3-1854, 6 pages.

* cited by examiner

MULTIPLEXING CONTROL AND DATA INFORMATION FROM A USER EQUIPMENT

PRIORITY

The present application claims priority under 35 U.S.C. §119(e) to U.S. Provisional Application No. 61/370,995, which was filed in the United States Patent and Trademark Office on Aug. 5, 2010, the content of which is incorporated herein by reference.

BACKGROUND OF THE INVENTION

1. Field of the Invention

The present invention relates generally to wireless communication systems and, more specifically, to the transmission of acknowledgement information in an uplink of a communication system.

2. Description of the Related Art

A communication system includes a DownLink (DL) that conveys transmission signals from a Base Station (BS or NodeB) to User Equipments (UEs), and an UpLink (UL) that conveys transmission signals from UEs to the NodeB. A UE, also commonly referred to as a terminal or a mobile station, may be fixed or mobile and may be a wireless device, a cellular phone, a personal computer device, etc. A NodeB is generally a fixed station and may also be referred to as a Base Transceiver System (BTS), an access point, or some other equivalent terminology.

The UL supports the transmission of data signals carrying information content, control signals providing control information associated with the transmission of data signals in the DL, and Reference Signals (RSs), which are commonly referred to as pilot signals. The DL also supports the transmission of data signals, control signals, and RSs.

UL data signals are conveyed through a Physical Uplink Shared CHannel (PUSCH) and DL data signals are conveyed through a Physical Downlink Shared CHannel (PDSCH).

In the absence of a PUSCH transmission, a UE conveys UL Control Information (UCI) through a Physical Uplink Control CHannel (PUCCH). However, when there is a PUSCH transmission, a UE may convey UCI together with data through the PUSCH.

DL control signals may be broadcast or sent in a UE-specific nature. Accordingly, UE-specific control channels can be used, among other purposes, to provide UEs with Scheduling Assignments (SAs) for PDSCH reception (DL SAs) or PUSCH transmission (UL SAs). The SAs are transmitted from the NodeB to respective UEs using DL Control Information (DCI) formats through respective Physical DL Control CHannels (PDCCHs).

A UE may be configured by the NodeB through higher layer signaling, such as Radio Resource Control (RRC) signaling, a PDSCH Transmission Mode (TM). The PDSCH TM is associated with a respective DL SA and defines whether the PDSCH conveys one data Transport Block (TB) or two data TBs. The UE may also be configured by NodeB communication, through higher layer signaling, over multiple DL cells for the potential reception of respectively multiple PDSCHs.

The UCI includes ACKnowledgment (ACK) information associated with a Hybrid Automatic Repeat reQuest (HARM) process (HARQ-ACK). The HARQ-ACK information may consist of multiple bits corresponding to positive ACKs for TBs correctly received by the UE, or Negative ACKnowledgements (NACKs) for TBs incorrectly received by the UE. A NACK may also be generated by a UE in response to the absence of a TB reception.

FIG. 1 illustrates a conventional PUSCH transmission structure.

Referring to FIG. 1, the Transmission Time Interval (TTI) is one subframe 110, which includes two slots. Each slot 120 includes $N_{symb}^{UL}$ symbols used to transmit data signals, UCI signals, or RSs. Each symbol 130 includes a Cyclic Prefix (CP) to mitigate interference due to channel propagation effects. The transmission in one slot 120 may be either at a same or at a different BandWidth (BW) than the transmission in the other slot. Some PUSCH symbols in each slot are used to a transmit RS 140, which enables channel estimation and coherent demodulation of the received data and/or UCI signals.

The transmission BW includes frequency resource units, referred to herein as Physical Resource Blocks (PRBs). Each PRB includes $N_{sc}^{RB}$ sub-carriers, or Resource Elements (REs), and a UE is allocated $M_{PUSCH}$ PRBs 150 for a total of $M_{sc}^{PUSCH} = M_{PUSCH} \cdot N_{sc}^{RB}$ REs for the PUSCH transmission BW.

The last subframe symbol may be used for transmitting a Sounding RS (SRS) 160 from one or more UEs. The SRS provides the NodeB with an estimate of the channel medium the respective UE experiences over the SRS transmission BW. The SRS transmission parameters are configured to each UE by the NodeB through higher layer signaling.

In FIG. 1, the number of subframe symbols available for transmission of data or UCI signals is $N_{symb}^{PUSCH} = 2 \cdot (N_{symb}^{UL} - 1) - N_{SRS}$, where $N_{SRS} = 1$ if the last subframe symbol is used for SRS transmission and $N_{SRS} = 0$ otherwise.

FIG. 2 illustrates a conventional transmitter for transmitting data information and HARQ-ACK information in a PUSCH.

Referring to FIG. 2, encoded HARQ-ACK bits 210 are inserted by puncturing encoded data bits 220 at a puncturing unit 230. The Discrete Fourier Transform (DFT) is then performed by a DFT unit 240. The REs for the PUSCH transmission BW are selected by a sub-carrier mapping unit 250 as instructed by a controller 255. Inverse Fast Fourier Transform (IFFT) is performed by an IFFT unit 260, CP insertion is performed by a CP insertion unit 270, and time windowing is performed by a filter 280, thereby generating a transmitted signal 290. For brevity, the encoding and modulation processes and additional transmitter circuitry such as digital-to-analog converter, analog filters, amplifiers, and transmitter antennas are not illustrated.

The PUSCH transmission is assumed to be over a single cluster 295A or over multiple clusters 295B of contiguous REs in accordance to the DFT Spread Orthogonal Frequency Division Multiple Access (DFT-S-OFDMA) method for signal transmission.

FIG. 3 illustrates a conventional receiver for receiving a transmission signal as illustrated in FIG. 2.

Referring to FIG. 3, an antenna receives a Radio-Frequency (RF) analog signal and after further processing units (such as filters, amplifiers, frequency down-converters, and analog-to-digital converters) which are not shown for brevity, a received digital signal 310 is filtered by a filter 320 and the CP is removed by a CP removal unit 330. Subsequently, the receiver unit applies a Fast Fourier Transform (FFT) by an FFT unit 340, selects the REs used by the transmitter by sub-carrier de-mapping by a sub-carrier demapping unit 350 under the control of a controller 355. Thereafter, an Inverse DFT (IDFT) unit 360 applies IDFT, an extraction unit 370 extracts the HARQ-ACK bits, places erasures at the respective REs for the data, and finally obtains data bits 380.

The RS transmission is assumed to be through a Constant Amplitude Zero Auto-Correlation (CAZAC) sequence. Orthogonal multiplexing of CAZAC sequences can be achieved by applying different Cyclic Shifts (CSs) to the same CAZAC sequence.

Assuming for simplicity that the PUSCH conveys a single data TB, then for HARQ-ACK transmission in the PUSCH, a UE determines the respective number of encoded symbols Q' as shown in Equation (1).

$$Q' = \min\left(\left\lceil \frac{O \cdot \beta_{offset}^{HARQ-ACK}}{Q_m \cdot R} \right\rceil, 4 \cdot M_{sc}^{PUSCH}\right) \quad (1)$$

In Equation (1), 0 is a number of HARQ-ACK information bits, $\beta_{offset}^{HARQ-ACK}$ is a parameter informed to the UE through RRC signaling, $Q_m$ is a number of data information bits per modulation symbol ($Q_m$=2, 4, 6 for QPSK, QAM16, QAM64, respectively), R is a data code rate of an initial PUSCH transmission for the same TB, $M_{sc}^{PUSCH}$ is a PUSCH transmission BW in a current subframe, and ⌈ ⌉ indicates the ceiling operation that rounds a number to its next integer.

The data code rate R is defined as shown in Equation (2).

$$R = \left(\sum_{r=0}^{C-1} K_r\right) / (Q_m \cdot M_{sc}^{PUSCH-initial} \cdot N_{symb}^{PUSCH-initial}) \quad (2)$$

In Equation (2), C is a total number of data code blocks and $K_r$ is a number of bits for data code block number r.

The maximum number of encoded HARQ-ACK symbols is limited to the number of REs in 4 DFT-S-OFDM symbols ($4 \cdot M_{sc}^{PUSCH}$). The nominal number of encoded HARQ-ACK symbols, $Q'_{nominal}$, to achieve a target reception reliability is $$Q'_{nominal} = \left(\left\lceil \frac{O \cdot \beta_{offset}^{HAQR-ACK}}{Q_m \cdot R} \right\rceil\right).$$

The determination for the number of encoded HARQ-ACK symbols when the PUSCH conveys multiple TBs is similar to when the PUSCH conveys one TB.

An HARQ-ACK information bit is encoded as a binary '1', if the TB is correctly received (ACK), or as a binary '0', if the TB is not received or is incorrectly received (NACK). For HARQ-ACK information consisting of 2 bits [$o_0^{ACK}$ $o_1^{ACK}$], with $o_0^{AcK}$ and $o_1^{ACK}$ the encoding is given in Table 1 where $o_2^{AcK}=(o_0^{ACK}+o_1^{ACK})$mod 2 to provide a (3, 2) simplex code for the 2-bit HARQ-ACK.

For HARQ-ACK information consisting of multiple bits, as it may be the case for operation in a Time Division Duplex (TDD) system or when the UE is configured by the NodeB communication in multiple cells, the encoding can be, for example, using a block code such as a Reed-Mueller code. To account for the coding gain, a factor g(O) corresponding to the gain of block coding or simplex coding (transmission of O>1 HARQ-ACK bits) over repetition coding (transmission of O=1 HARQ-ACK bits) can be included in the determination of required coded symbols as shown in Equation (3).

$$Q' = \min\left(\left\lceil \frac{O \cdot \beta_{offset}^{HARQ-ACK}}{Q_m \cdot R \cdot g(O)} \right\rceil, 4 \cdot M_{sc}^{PUSCH}\right) \quad (3)$$

Alternatively, as an approximation, the coding gain factor g(O) may be absorbed in the parameter $\beta_{offset}^{HARQ-ACK}$. Then, Equation (3) is the same as Equation (1).

A UE may determine the number of HARQ-ACK information bits O depending on its operating environment. Examples are subsequently described.

For a Frequency Division Duplex (FDD) system and communication over a single DL cell, a UE may determine O based on the number of TBs it receives in a PDSCH.

For a TDD system and communication over a single DL cell, a UE may determine O based on the number of TBs for the configured TM and based on a number of PDSCHs that is either indicated by the UL SA scheduling the PUSCH transmission or, if such an UL SA does not exist, based on the maximum number of PDSCHs for which the UE may generate HARQ-ACK information in the PUSCH.

For an FDD system and UE configured communication over multiple DL cells, the UE may determine O based on the number of TBs for the configured TM in each configured cell and based on the number of configured DL cells.

For a TDD system and UE configured communication over multiple DL cells, a UE may determine O based on the number of TBs for the configured TM in each configured DL cell and based on a number of PDSCHs for each configured DL cell that is either indicated by the UL SA scheduling the PUSCH transmission or, if such an UL SA does not exist, based on the maximum number of PDSCHs for which the UE may generate HARQ-ACK information in the given PUSCH.

As HARQ-ACK requires the highest reception reliability among UCI types, the respective REs are located only in DFT-S-OFDM symbols next to the RS in each slot in order to obtain the most accurate channel estimate for HARQ-ACK demodulation.

FIG. 4 illustrates the multiplexing of HARQ-ACK REs in a PUSCH subframe.

Referring to FIG. 4, encoded HARQ-ACK bits 410 are placed in REs next to an RS 420 in each slot of a PUSCH subframe. The placement starts from the RE with the highest

TABLE 1

Encoding for 1-bit and 2-bits of HARQ-ACK

| $Q_m$ | Encoded HARQ-ACK - 1 bit | Encoded HARQ-ACK - 2 bits |
|---|---|---|
| 2 | [$o_0^{ACK}$ y] | [$o_0^{ACK}$ $o_1^{ACK}$ $o_2^{ACK}$ $o_0^{ACK}$ $o_1^{ACK}$ $o_2^{ACK}$] |
| 4 | [$o_0^{ACK}$ y x x] | [$o_0^{ACK}$ $o_1^{ACK}$ x x $o_2^{ACK}$ $o_0^{ACK}$ x x $o_1^{ACK}$ $o_2^{ACK}$ x x] |
| 6 | [$o_0^{ACK}$ y x x x x] | [$o_0^{ACK}$ $o_1^{ACK}$ x x x x $o_2^{ACK}$ $o_0^{ACK}$ x x x x $o_1^{ACK}$ $o_2^{ACK}$ x x x x] | index (in a virtual frequency domain) and continues with lower indexed REs sequentially. The remaining portions of the subframe may convey data information bits 430.

When the number of the HARQ-ACK information bits is large and the Spectral Efficiency (SE) of the PUSCH transmission is low (as determined by the product of $Q_m \cdot R$), the number of encoded HARQ-ACK symbols $Q_{nominal}'$ may exceed the upper bound of $4 \cdot M_{sc}^{PUSCH}$. In that case, the required HARQ-ACK reception reliability cannot be met.

The number of HARQ-ACK information bits can be reduced by HARQ-ACK bundling, which the NodeB can configure a UE to perform through higher layer signaling, e.g. when the UE has low UL SINR. HARQ-ACK bundling is a compression mechanism for the total number of HARQ-ACK information bits and can be in the spatial domain, the time domain, the cell domain, or a combination of these domains. Spatial domain bundling is applicable when a single PDSCH transmission conveys multiple TBs. Time domain bundling is applicable in TDD systems where a UE can receive multiple TBs through multiple PDSCHs in respective multiple DL TTIs. Cell domain bundling is applicable when a UE receives multiple PDSCHs from respective multiple cells in the same DL TTI.

For HARQ-ACK bundling in a given domain, a UE generates a single HARQ-ACK information bit corresponding to multiple TBs in that domain. If the UE correctly receives all of these multiple TBs, the HARQ-ACK information bit has the ACK value (binary 1). If the UE incorrectly receives (or does not receive) any of these multiple TBs, the HARQ-ACK information bit has the NACK value (binary 0).

Although conventional HARQ-ACK bundling can reduce the number of HARQ-ACK information bits even to a single bit, it is also highly suboptimal as it eliminates most of the HARQ-ACK information. For example, if a UE correctly receives all TBs except one, it generates a NACK, which will result in unnecessary retransmissions for all TBs except for the incorrectly received one. Moreover, as the NodeB cannot know which TBs the UE incorrectly received, the respective HARQ process cannot be applied with the correct Redundancy Version (RV). Additionally, HARQ-ACK bundling is configured to a UE by the NodeB through RRC signaling, it cannot account for dynamic changes in the number of available resources (REs) for HARQ-ACK multiplexing in the PUSCH.

SUMMARY OF THE INVENTION

The present invention has been designed to address at least the above problems and/or disadvantages and to provide at least the advantages described below. Accordingly, an aspect of the present invention provides methods and apparatus for a UE to adaptively perform bundling of the HARQ-ACK information it transmits in a PUSCH depending on the total number of resources the UE has available for HARQ-ACK multiplexing in the PUSCH and on the resources required to achieve a target reception reliability for a given number of HARQ-ACK information bits.

In accordance with an aspect of the present invention, a method is provided for a UE to transmit acknowledgement information together with data information to a base station during a TTI. The acknowledgement information initially has a first set of Acknowledgement Information Bits (AIBs). A number of nominal resources for transmission of the first set of AIBs is determined. The number of nominal resources for the transmission of the first set of AIBs is compared to a number of resources available to the UE for transmission of the acknowledgement information. The first set of AIBs is transmitted if the number of nominal resources is less than or equal to the number of available resources. A second set of AIBs is selected from the first set of AIBs and one or more bundling operations are performed over respective one or more distinct subsets of AIBs in the second set of AIBs to obtain a third set of AIBs if the number of nominal resources is greater than the number of available resources. At least one of the one or more bundling operations generates a smaller number of AIBs than a number of AIBs in the respective distinct subset of AIBs. The third set of AIBs and a fourth set of AIBs are transmitted. The fourth set of AIBs is obtained from AIBs that belong in the first set but not in the second set.

In accordance with another aspect of the present invention, a UE apparatus is provided for transmitting acknowledgement information together with data information to a base station during a TTI. The acknowledgement information initially has a first set of AIBs. The UE apparatus includes a computing unit (900) for computing a number of nominal resources for transmission of the first set of AIBs. The UE apparatus also includes a comparator (902) for comparing the number of nominal resources for the transmission of the first set of AIBs to a number of resources available to the UE apparatus for the transmission of the acknowledgement information. The UE apparatus additionally includes a selector (810, 820, 830) for selecting a second set of AIBs from the first set of AIBs. The UE apparatus further includes a bundling unit (840) for performing one or more bundling operations over respective one or more distinct subsets of AIBs in the second set of AIBs to obtain a third set of AIBs if the number of nominal resources is greater than the number of available resources. At least one of the one or more bundling operations generates a smaller number of AIBs than a number of AIBs in the respective distinct subset of AIBs. The apparatus also includes a transmitter (904) for transmitting the first set of AIBs if the number of nominal resources is less than or equal to the number of available resources or for transmitting the third set of AIBs and a fourth set of AIBs. The fourth set of AIBs is obtained from AIBs that belong in the first set but not in the second set if the number of nominal resources is greater than the number of available resources. in addition to the operation of HARQ-ACK bundling being adaptive, the number of HARQ-ACK information bits that are bundled is also adaptive and can be based on the maximum number of HARQ-ACK information bits for which the resulting number of PUSCH resources required to achieve a target reception reliability is smaller than or equal to total number of PUSCH resources available for HARQ-ACK transmission.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
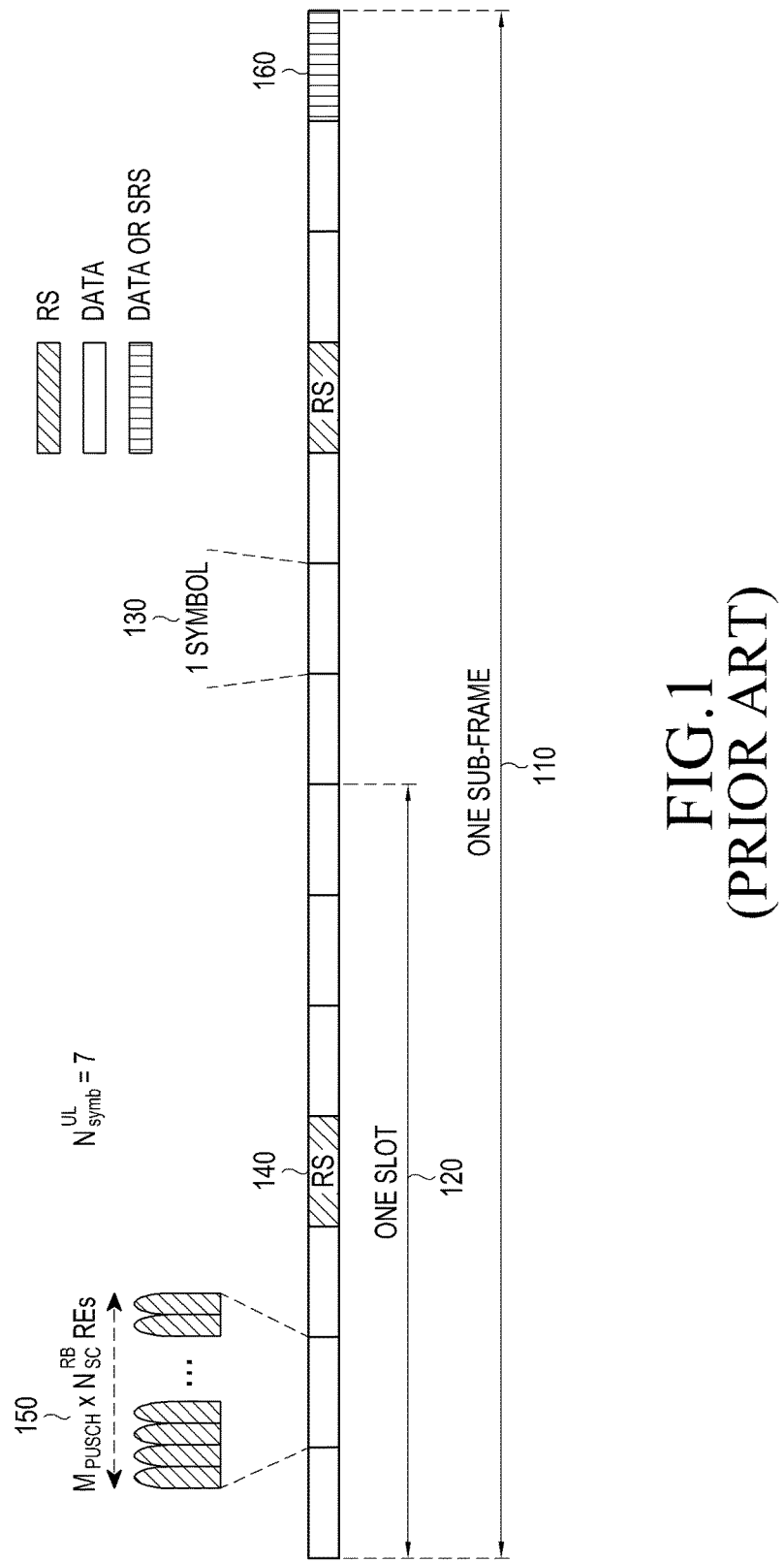
FIG. 1 is a diagram illustrating a conventional PUSCH subframe structure.
Figure 2:
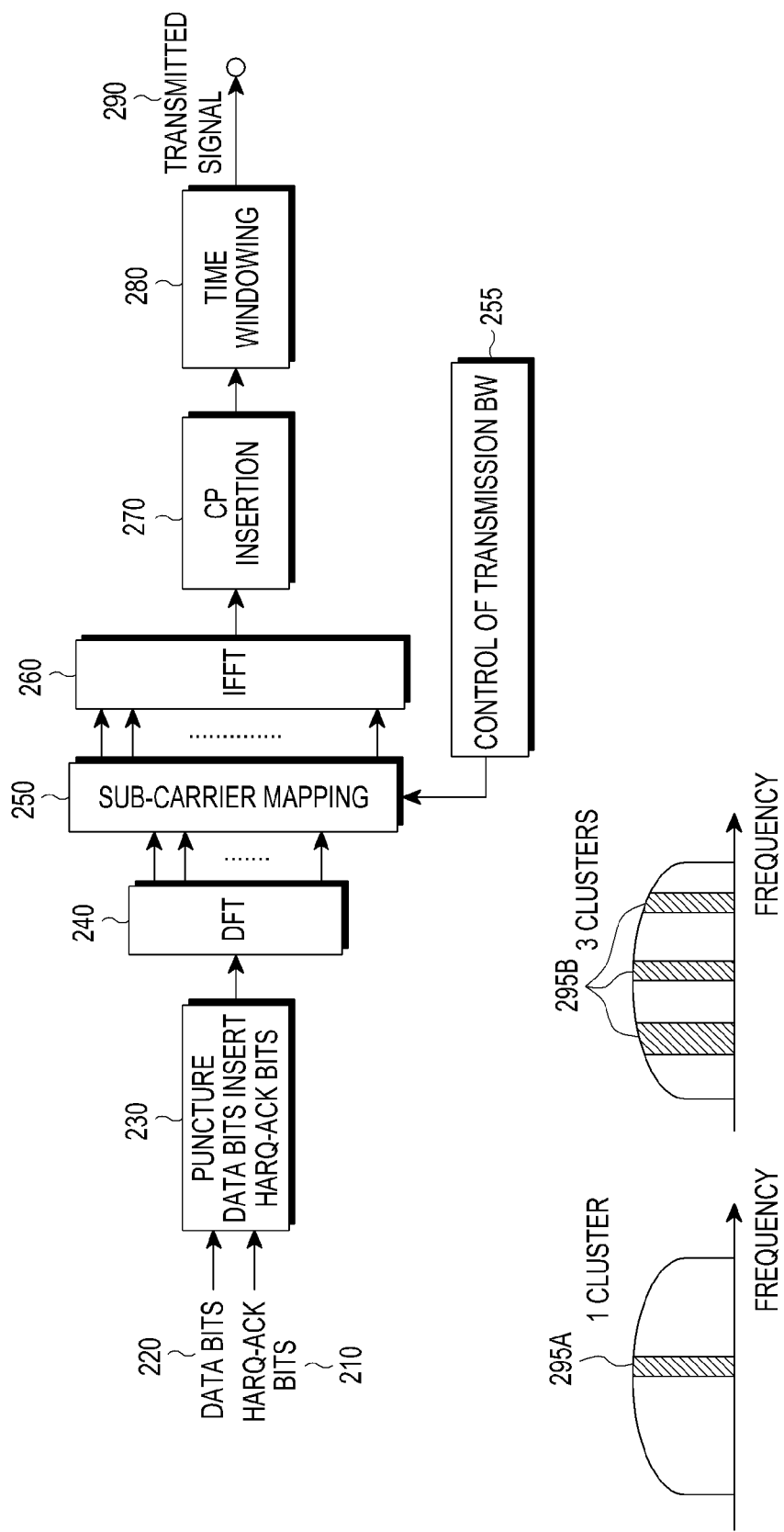
FIG. 2 is a block diagram illustrating a conventional transmitter for transmitting data and HARQ-ACK signals in a PUSCH.
Figure 3:
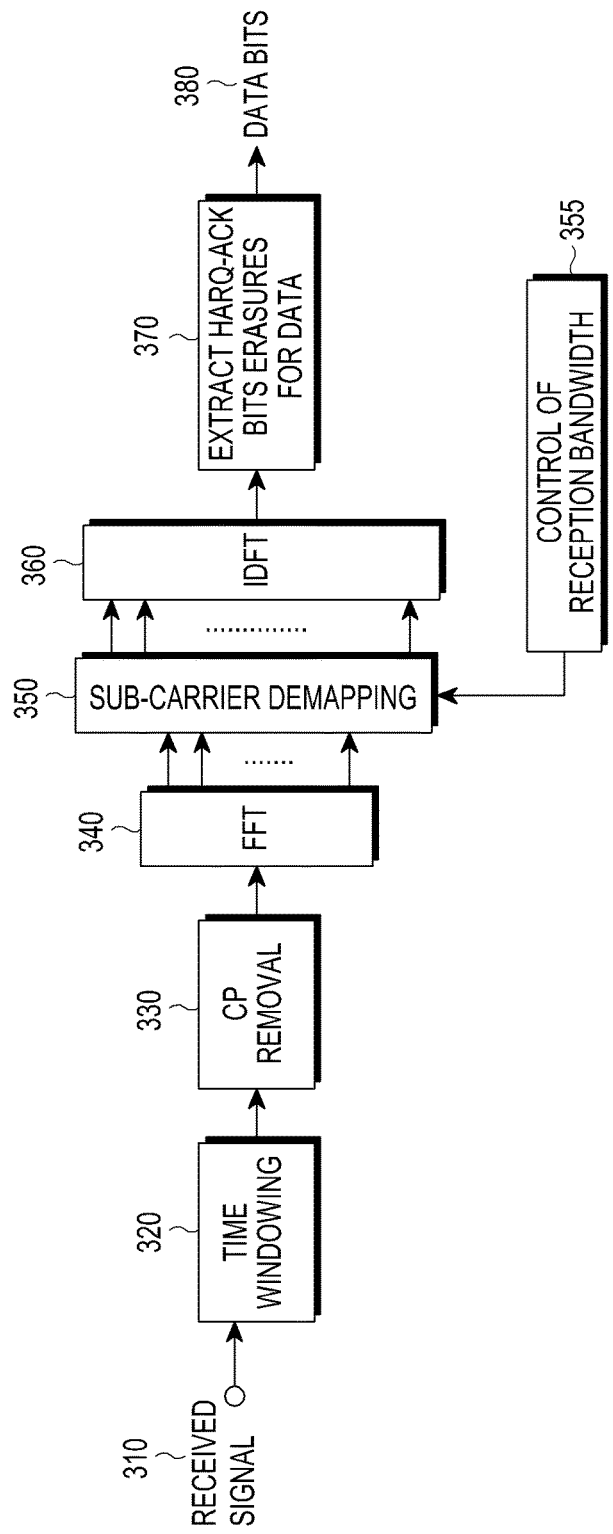
FIG. 3 is a block diagram illustrating a conventional receiver for receiving data and HARQ-ACK signals in the PUSCH.
Figure 4:
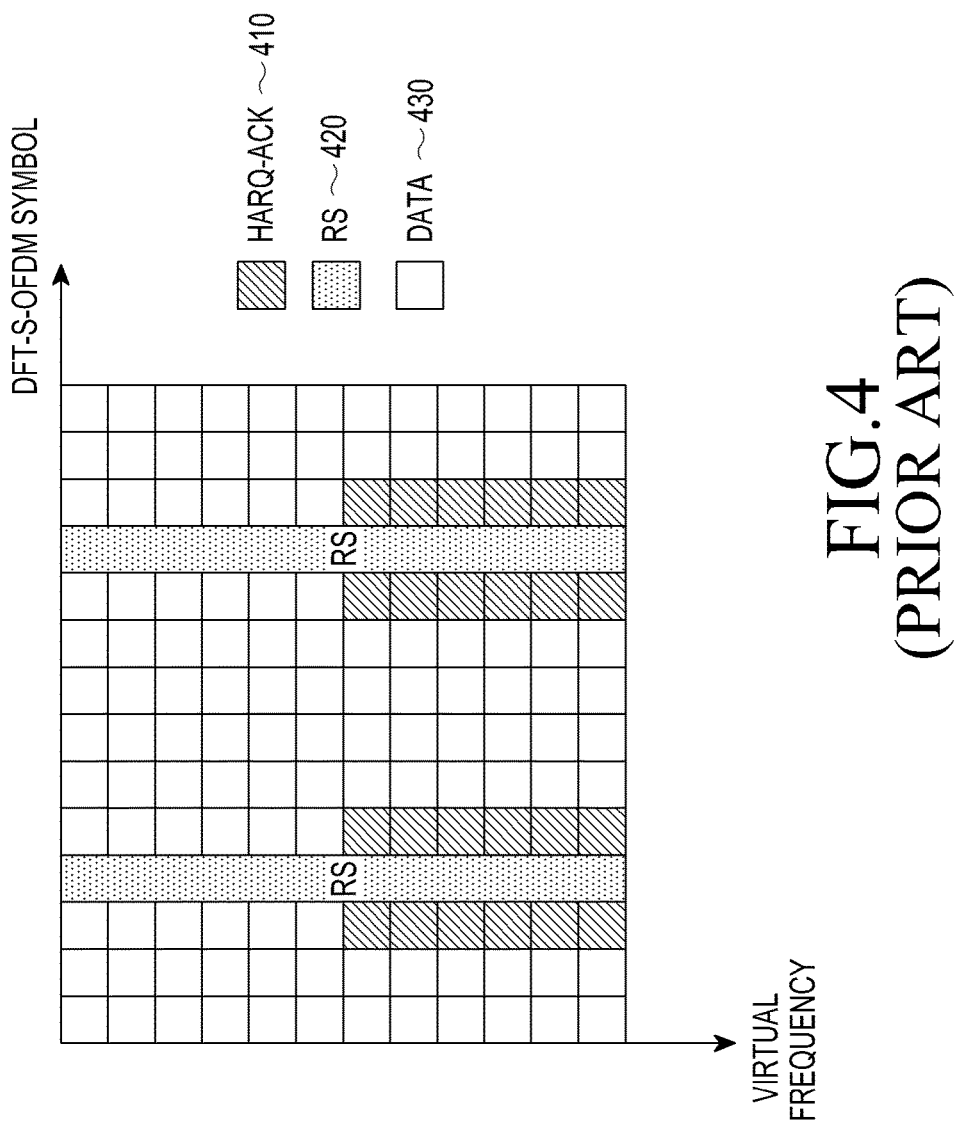
FIG. 4 is a diagram illustrating conventional multiplexing of HARQ-ACK sub-carriers and data sub-carriers in a PUSCH.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Additionally, although the embodiments of the present invention will be described below with reference to DFT-spread OFDM transmission, they also are applicable to all Frequency Division Multiplexing (FDM) transmissions in general and to Single-Carrier Frequency Division Multiple Access (SC-FDMA) and OFDM in particular.

In accordance with an embodiment of the present invention, HARQ-ACK bundling in the PUSCH is dynamic and it is triggered when the number of HARQ-ACK coded symbols $Q_{nominal}'$ required to achieve the target HARQ-ACK reception reliability exceeds the upper bound of $4 \cdot M_{sc}^{PPUSCH}$ ($Q_{nominal}'>4 \cdot M_{sc}^{PUSCH}$). As is subsequently further described, when triggered, HARQ-ACK bundling may apply in a predetermined manner either across all HARQ-ACK information bits in the spatial domain, time domain, or cell domain, or across all HARQ-ACK information bits in combinations of these domains.

Both $Q_{nominal}'$ and $4 \cdot M_{sc}^{PUSCH}$ should be known to both the UE and the NodeB in order for the operation of dynamic HARQ-ACK bundling to be unambiguous. For $Q_{nominal}'$, this requires that both the UE and the NodeB have the same understanding for the initial HARQ-ACK payload (initial number of HARQ-ACK information bits prior to HARQ-ACK bundling). This can be achieved by either the initial number of HARQ-ACK information bits being predetermined, depending on, for example, the number of DL cells the UE is configured to receive PDSCH or the number of DL TTIs for which the UE generates HARQ-ACK in the UL subframe, or being explicitly indicated to the UE by the NodeB through the UL SA, if any, scheduling the PUSCH transmission. For $4 \cdot M_{sc}^{PUSCH}$ this requires that the UE and the NodeB have the same understanding of the PUSCH transmission BW, which, excluding incorrect operation conditions, is always the case.

Figure 5:
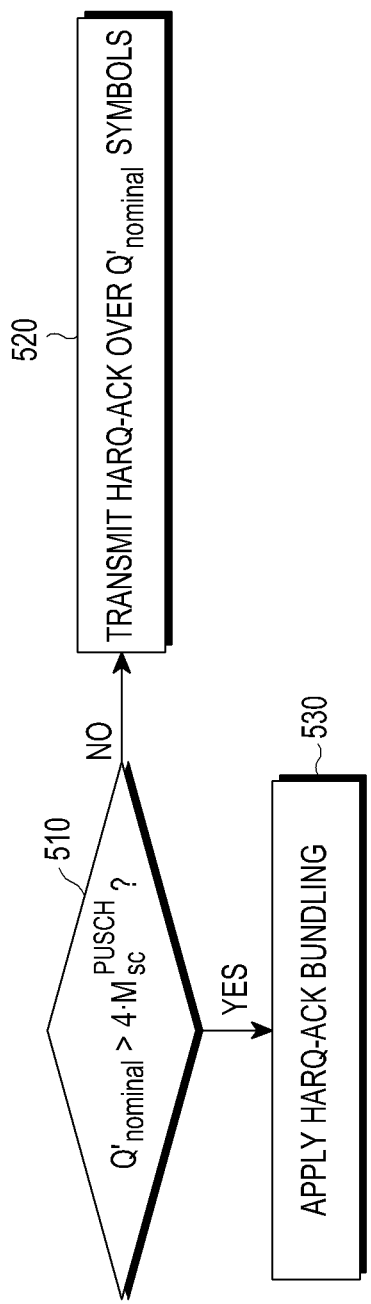
FIG. 5 is a diagram illustrating the principle of dynamic application of HARQ-ACK bundling by a UE, according to an embodiment of the present invention.

FIG. 5 illustrates the principle of dynamic HARQ-ACK bundling application by a UE, according to an embodiment of the present invention.

Referring to FIG. 5, the UE first determines a number of coded symbols $Q_{nominal}'$ in step 510. If $Q_{nominal}' \leq 4 \cdot M_{sc}^{PUSCH}$ the HARQ-ACK bits are transmitted without any bundling using $Q_{nominal}'$ symbols in step 520. If $Q_{nominal}' > 4 \cdot M_{sc}^{PUSCH}$, then HARQ-ACK bundling is applied in step 530.

In accordance with another embodiment of the present invention, the number of initial HARQ-ACK information bits that are bundled is adaptive. In the previous embodiment, HARQ-ACK bundling is applied when $Q_{nominal}' > 4 \cdot M_{sc}^{PUSCH}$ and, depending on the available domains and the domains involved in the bundling operation, it may reduce the number of HARQ-ACK information bits to a number that is smaller than the one required to achieve a target reception reliability by utilizing the available PUSCH resources.

In order to minimize the impact from the information loss associated with HARQ-ACK bundling, the number of initial HARQ-ACK information bits that are bundled can also be adaptive. The adaptation can be based on the maximum number of HARQ-ACK information bits for which $Q_{nominal}'$ is smaller than or equal to $4 \cdot M_{sc}^{PUSCH}$. Therefore, if $Q_{nominal}' > 4 \cdot M_{sc}^{PUSCH}$, the number of HARQ-ACK bits after adaptive HARQ-ACK bundling can be more than one HARQ-ACK bit and is determined as shown in Equation (4).

$$O_{bundle} = \underset{O_b}{\operatorname{argmax}}(Q_{nominal}'(O_b)) \text{ subject to } Q_{nominal}' \leq 4 \cdot M_{sc}^{PUSCH} \qquad (4)$$

There are several approaches for a UE to implement the principle of adaptive HARQ-ACK bundling and generate an adaptive number of bundled HARQ-ACK information bits. One approach is to progressively decrease the number of HARQ-ACK information bits from the initial nominal value of $O>1$ (before any HARQ-ACK bundling) until the UE determines, as in Equation (4), a number of HARQ-ACK information bits $O_{bundle}$ for which it is $Q_{nominal}' \leq 4 \cdot M_{sc}^{PUSCH}$. HARQ-ACK bundling can start from a predetermined HARQ-ACK bit, such as the last HARQ-ACK information bit, or from a particular domain, such as the spatial domain, and continue if needed in the remaining domains.

For example, considering for simplicity $$Q_{nominal}' = \left(\left\lceil \frac{O \cdot \beta_{offset}^{PUSCH}}{Q_m \cdot R} \right\rceil\right)$$

and assuming that $4 \cdot M_{sc}^{PUSCH}=96$, if a UE needs to convey $O=6$ HARQ-ACK information bits for which $Q_{nominal}'=120$ then it needs to apply HARQ-ACK bundling. As $O=5$ HARQ-ACK bits require $Q_{nominal}'=100$ and $O=4$ HARQ-ACK bits require $Q_{nominal}'=80$, it is $O_{bundle}=4$. Therefore, through HARQ-ACK bundling, the UE reduces the number of HARQ-ACK information bits by 2.

Figure 6:
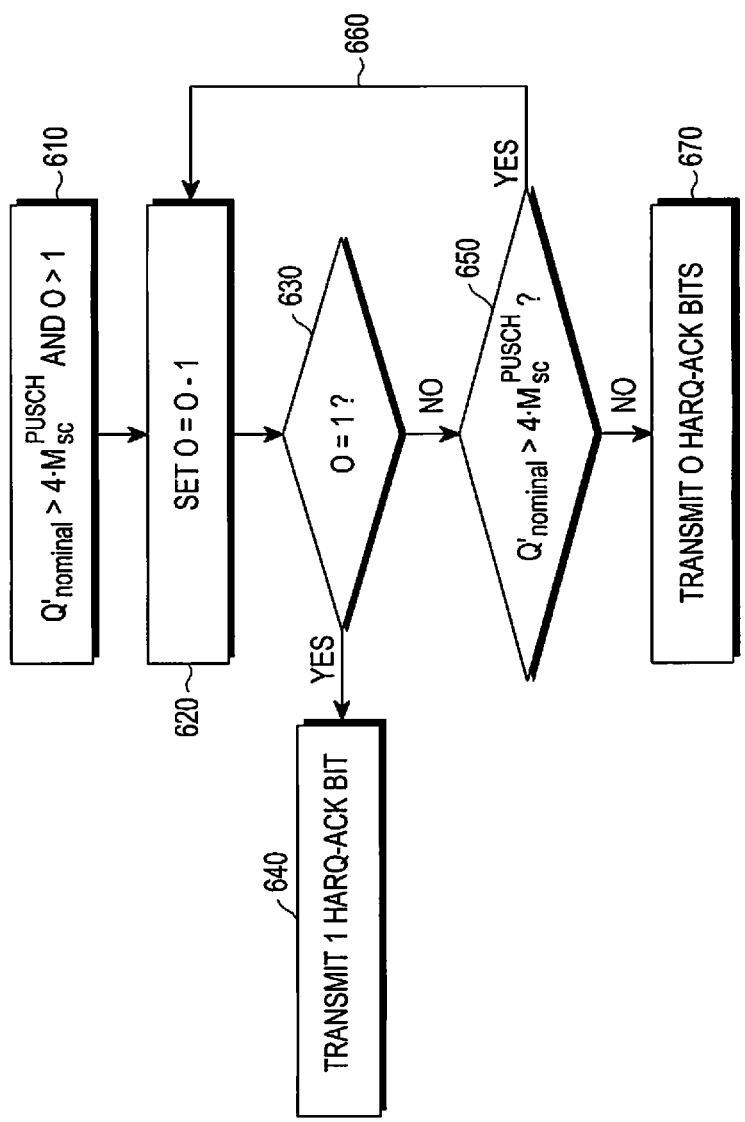
FIG. 6 is a diagram illustrating a process for adaptively determining the number of bundled HARQ-ACK information bits, according to an embodiment of the present invention.

FIG. 6 illustrates the process for adaptively determining the number of bundled HARQ-ACK information bits, according to an embodiment of the present invention.

Referring to FIG. 6, the process is triggered in case $Q_{nominal}' > 4 \cdot M_{sc}^{PUSCH}$ and the UE has more than 1 HARQ-ACK information bit to transmit (otherwise, HARQ-ACK bundling is not applicable), in step 610. In step 620, the number of HARQ-ACK information bits considered for transmission in the PUSCH is reduced by one by setting O=O−1. If O=1 in step 630, the process terminates by transmitting 1 HARQ-ACK information bit in step 640 using the respective number of symbols Q' for O=1. If O≠1 in step 630, the UE examines whether $Q_{nominal}' > 4 \cdot M_{sc}^{PUSCH}$, in step 650. If $Q_{nominal}' \le 4 \cdot M_{sc}^{PUSCH}$, the process follows 660 and continues by repeating step 620. If $Q_{nominal}' \le 4 \cdot M_{sc}^{PUSCH}$, the process terminates by transmitting O HARQ-ACK information bits, in step 670, using the respective number of symbols Q'.

Although the HARQ-ACK bundling process in FIG. 6 considers that the number of HARQ-ACK information bits is progressively reduced by one until it becomes either one or such that it can be transmitted in less than or equal to $4 \cdot M_{sc}^{PUSCH}$ REs (or both), other reduction approaches may instead apply.

In another approach, at each iteration of the adaptive HARQ-ACK bundling process, the reduction in the number of HARQ-ACK information bits can be by a predetermined number that is larger than one or by a predetermined percentage of the HARQ-ACK information bits that remain at the given iteration of the HARQ-ACK bundling process. For example about half the existing HARQ-ACK information bits can be bundled at each iteration by setting O=⌈O/2⌉ (or O=⌊O/2⌋). Regardless of the exact reduction method for the number of HARQ-ACK information bits, the principle for adaptively determining their number based on the maximum resources available for their transmission applies.

Several approaches also exist for the selection of the HARQ-ACK information bits that are bundled for adaptive HARQ-ACK bundling. This selection can be based on some predetermined rule, or on some prioritization for the bundling domain, or on both.

In a first approach, the last (or the first) $O_{initial} - O_{bundle} + 1$ HARQ-ACK information bits from the $O_{initial}$ HARQ-ACK information bits can be bundled into a single bit.

Figure 7:
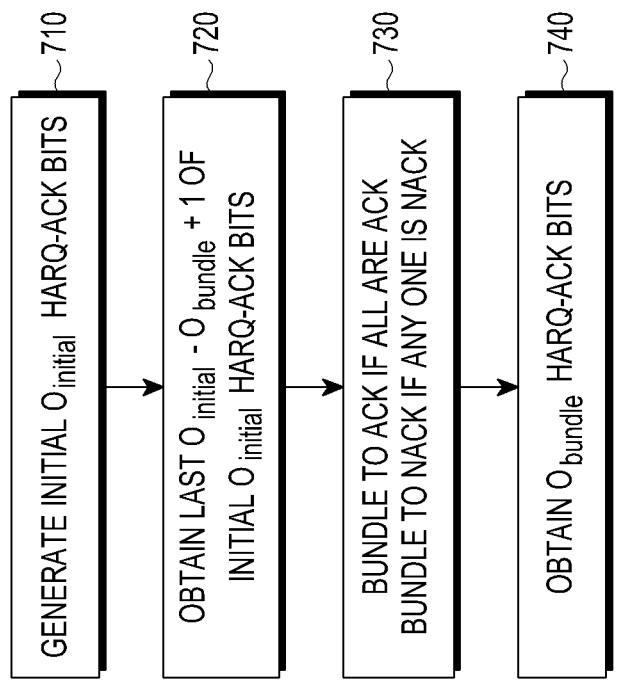
FIG. 7 is a diagram illustrating a HARQ-ACK bundling process for $O_{initial}-O_{bundle}+1$ HARQ-ACK information bits into a single HARQ-ACK information bit, according to an embodiment of the present invention.

FIG. 7 illustrates a HARQ-ACK bundling process for the last $O_{initial} - O_{bundle} + 1$ HARQ-ACK information bits into a single HARQ-ACK information bit, according to an embodiment of the present invention.

Referring to FIG. 7, $O_{initial}$ HARQ-ACK bits are generated in step 710. The last $O_{initial} - O_{bundle} + 1$ HARQ-ACK bits of the initial $O_{initial}$ HARQ-ACK information bits are obtained in step 720, and bundled into a single HARQ-ACK information bit, in step 730. The information bits are bundled to an ACK if all are ACKs and are bundled to a NACK if any one is a NACK. A total of $O_{bundle}$ HARQ-ACK information bits are obtained, in step 740.

In a second approach, HARQ-ACK bundling can be done in a consecutive fashion across the initial HARQ-ACK information bits by bundling the first and second HARQ-ACK information bits, the third and fourth HARQ-ACK bits and so on. If $O_{initial} - O_{bundle} \le O_{bundle}$, the HARQ-ACK bundling process continues until $O_{initial} - O_{bundle}$ bundled HARQ-ACK information bits are obtained. If $O_{initial} - O_{bundle} > O_{bundle}$, the HARQ-ACK bundling process iteratively continues by obtaining ⌈$O_{initial}/2$⌉ HARQ-ACK bits at the end of each iteration where $O_{initial}$ is the number of HARQ-ACK bits at the beginning of each iteration.

Figure 8:
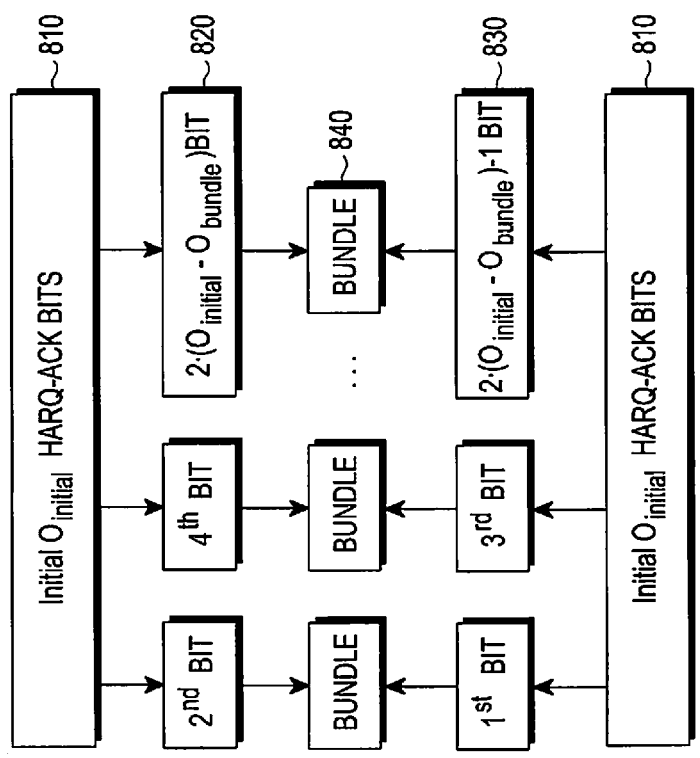
FIGS. 8 and 9 are diagrams illustrating a bundling process operating in a consecutive manner across the initial HARQ-ACK information bits, according to an embodiment of the present invention.
Figure 9:
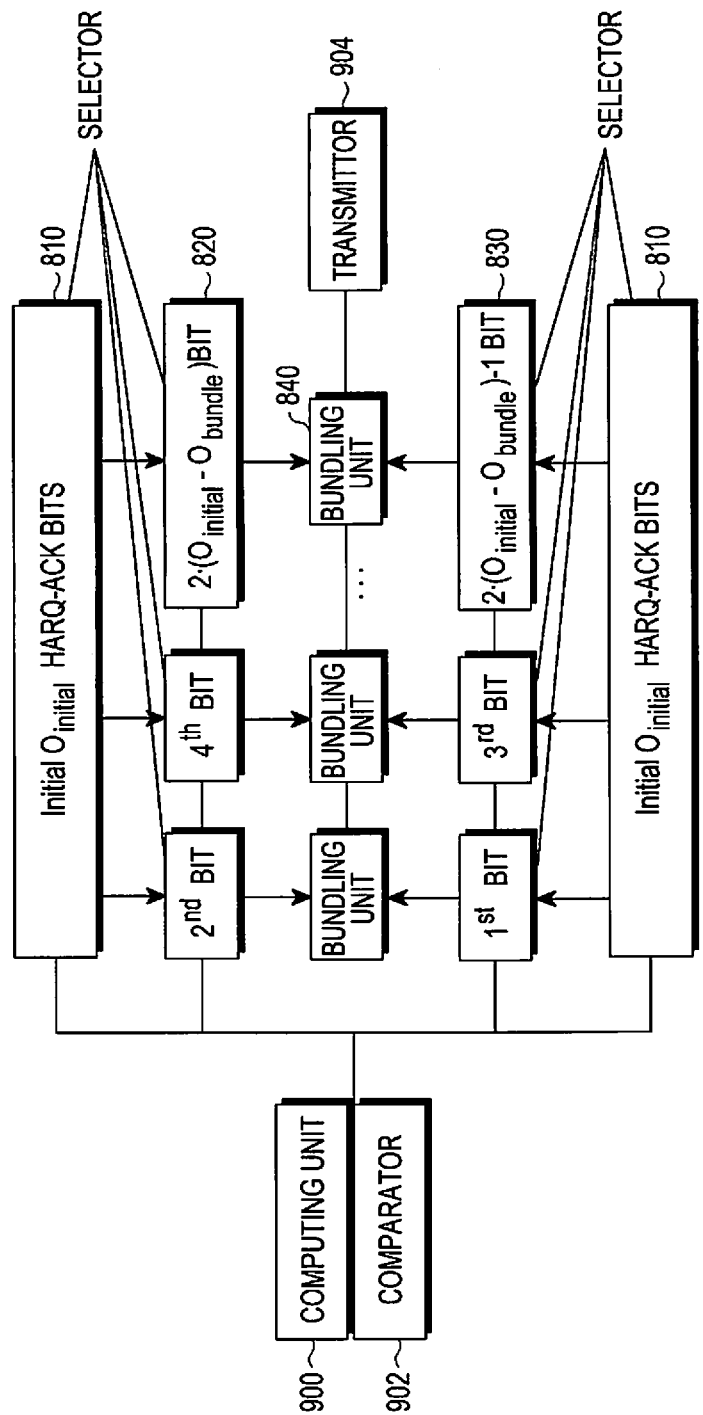

FIG. 8 is a diagram illustrating a bundling process operating in a consecutive manner across the initial HARQ-ACK information bits, according to an embodiment of the present invention.

Referring to FIG. 8, assuming for simplicity, that $O_{initial} - O_{bundle} \le O_{bundle}$, the first 2k−1, k=1, ..., $O_{initial} - O_{bundle}$ HARQ-ACK information bits are bundled with the first 2k, k=1, ..., $O_{initial} - O_{bundle}$ HARQ-ACK information bits. Each of even numbered first $2 \cdot (O_{initial} - O_{bundle})$ HARQ-ACK information bits 820 from initial $O_{initial}$ HARQ-ACK information bits 810 and each of odd numbered first $2 \cdot (O_{initial} - O_{bundle}) - 1$ HARQ-ACK information bits 830 from the initial $O_{initial}$ HARQ-ACK information bits 810 are respectively bundled in block 840. The resulting $O_{initial} - O_{bundle}$ bundled HARQ-ACK information bits are combined with the last $(2 \cdot O_{bundle} - O_{initial})$ of the initial $O_{initial}$ HARQ-ACK information bits to finally transmit $O_{bundle}$ HARQ-ACK information bits.

Alternatively, HARQ-ACK bundling may be prioritized to be performed first in the spatial domain, as the multiple TBs associated with the same PDSCH reception are likely to be either all correctly received or all incorrectly received, continuing with prioritizing HARQ-ACK bundling in the time domain in case of a TDD system, and finally having HARQ-ACK bundling in the cell domain in case the UE receives PDSCH in multiple cells of the communication system. Then, spatial-domain HARQ-ACK bundling (when applicable) can be first performed if $Q_{nominal}' > 4 \cdot M_{sc}^{PUSCH}$. If after spatial-domain HARQ-ACK bundling, it is still $Q_{nominal}' > 4 \cdot M_{sc}^{PUSCH}$, time-domain HARQ-ACK bundling (when applicable) can be performed next. Finally, if after both spatial-domain HARQ-ACK bundling and time-domain HARQ-ACK bundling, it is still $Q_{nominal}' > 4 \cdot M_{sc}^{PUSCH}$, cell-domain HARQ-ACK bundling (when applicable) may be performed.

Finally, as described by the embodiments of the invention, HARQ-ACK bundling in each domain may either be performed across all respective HARQ-ACK information bits in that domain (fixed bundling) or across only a number HARQ-ACK information bits determined so that, after bundling, it is $Q_{nominal}' \le 4 \cdot M_{sc}^{PUSCH}$ (adaptive bundling).

While the present invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method for a user equipment (UE) to transmit acknowledgement information together with data information during a transmission time interval (TTI), the acknowledgement information initially having a first set of hybrid automatic repeat request acknowledgement (HARQ-ACK) information bits, the method comprising the steps of:
    determining a number of required resources for transmission of the first set of HARQ-ACK information bits;
    comparing the number of required resources to a number of available resources available for transmission of the acknowledgement information;
    determining that the number of required resources is greater than the number of available resources;
    selecting a second set of HARQ-ACK information bits from the first set of HARQ-ACK information bits and performing one or more adaptive bundling operations over respective one or more distinct subsets of HARQ-ACK information bits in the second set of HARQ-ACK information bits to obtain a third set of HARQ-ACK information bits in response to the number of required resources being greater than the number of available resources, wherein at least one of the one or more adaptive bundling operations generates a smaller number of HARQ-ACK information bits than a number of HARQ-ACK information bits in the respective distinct subset of HARQ-ACK information bits; and
    transmitting the third set of HARQ-ACK information bits and a fourth set of HARQ-ACK information bits, wherein the fourth set of HARQ-ACK information bits is obtained from HARQ-ACK information bits that belong in the first set but not in the second set, wherein the one or more adaptive bundling operations are performed in a spatial domain until the number of required resources is not larger than the number of available resources, and wherein the one or more adaptive bundling operations generate an adaptive number of bundled HARQ-ACK information bits.

2. The method of claim 1, wherein the UE determines the first set of HARQ-ACK information bits based on information provided through a control channel or through higher layer signaling.

3. The method of claim 1, wherein each distinct subset of HARQ-ACK information bits contains HARQ-ACK information bits corresponding to data transport blocks the UE is configured to receive in a data channel.

4. The method of claim 3, wherein the at least one of the one or more adaptive bundling operation generates a HARQ-ACK information bit of value "1" if each HARQ-ACK information bit in the respective distinct subset of HARQ-ACK information bits has value "1" and generates a HARQ-ACK information bit of value "0" if any HARQ-ACK information bit in the respective distinct subset of HARQ-ACK information bits has value "0".

5. The method of claim 1, wherein each distinct subset of HARQ-ACK information bits contains HARQ-ACK information bits corresponding to data transport blocks the UE may receive over a number of TTIs that is informed to the UE either through higher layer signaling or through a control channel.

6. The method of claim 1, wherein the second set of HARQ-ACK information bits is the same as the first set of HARQ-ACK information bits and the fourth set of HARQ-ACK information bits is empty.

7. The method of claim 1, wherein the number of required resources is represented by a number of encoded symbols for the acknowledgement information, and the number of available resources is represented by four times a number of resource elements for a physical uplink shared channel (PUSCH) transmission bandwidth in a subframe.

8. The method of claim 1, before the step of transmitting the third set of HARQ-ACK information bits and the fourth set of HARQ-ACK information bits, further comprising:
determining the number of required resources for transmission of the first set of HARQ-ACK information bits;
when the number of required resources is still greater than the number of available resources, performing one or more adaptive bundling operations in a time domain over respective one or more distinct subsets of HARQ-ACK information bits in the second set of HARQ-ACK information bits to obtain the third set of HARQ-ACK information bits.

9. A user equipment (UE) apparatus for transmitting acknowledgement information together with data information during a transmission time interval (TTI), the acknowledgement information initially having a first set of hybrid automatic repeat request acknowledgement (HARQ-ACK) information bits, the apparatus comprising:
a computing unit for computing a number of required resources for transmission of the first set of HARQ-ACK information bits;
a comparator for comparing the number of required resources for the transmission of the first set of HARQ-ACK information bits to a number of available resources available to the UE apparatus for the transmission of the acknowledgement information;
a selector for selecting a second set of HARQ-ACK information bits from the first set of HARQ-ACK information bits;
a bundling unit for determining that the number of required resources is greater than the number of available resources and performing one or more adaptive bundling operations over respective one or more distinct subsets of HARQ-ACK information bits in the second set of HARQ-ACK information bits to obtain a third set of HARQ-ACK information bits in response to the number of required resources being greater than the number of available resources, wherein at least one of the one or more adaptive bundling operations generates a smaller number of HARQ-ACK information bits than a number of HARQ-ACK information bits in the respective distinct subset of HARQ-ACK information bits; and
a transmitter for transmitting the third set of HARQ-ACK information bits and a fourth set of HARQ-ACK information bits, wherein the fourth set of HARQ-ACK information bits is obtained from HARQ-ACK information bits that belong in the first set but not in the second set,
wherein the bundling unit is configured to perform the one or more adaptive bundling operations in a spatial domain until the number of required resources is not larger than the number of available resources, and
wherein the one or more adaptive bundling operations generate an adaptive number of bundled HARQ-ACK information bits.

10. The apparatus of claim 9, wherein the first set of HARQ-ACK information bits is determined based on information provided to the UE apparatus through a control channel or through higher layer signaling.

11. The apparatus of claim 9, wherein each distinct subset of HARQ-ACK information bits contains HARQ-ACK information bits corresponding to data transport blocks the UE apparatus is configured to receive in a data channel.

12. The apparatus of claim 11, wherein the at least one of the one or more adaptive bundling operation generates a HARQ-ACK information bit of value "1" if each HARQ-ACK information bit in the respective distinct subset of HARQ-ACK information bits has value "1" and generates a HARQ-ACK information bit of value "0" if any HARQ-ACK information bit in the respective distinct subset of HARQ-ACK information bits has value "0".

13. The apparatus of claim 9, wherein each distinct subset of HARQ-ACK information bits contains HARQ-ACK information bits corresponding to data transport blocks the UE apparatus may receive over a number of TTIs that is informed to the UE apparatus either through higher layer signaling or through a control channel.

14. The apparatus of claim 9, wherein the second set of HARQ-ACK information bits is the same as the first set of HARQ-ACK information bits and the fourth set of HARQ-ACK information bits is empty.

15. The apparatus of claim 9, wherein the number of required resources is represented by a number of encoded symbols for the acknowledgement information, and the number of available resources is represented by four times a number of resource elements for a physical uplink shared channel (PUSCH) transmission bandwidth in a subframe.

16. The apparatus of claim 9, wherein when the number of required resources is still greater than the number of available resources, the bundling unit is further configured to perform one or more adaptive bundling operations in a time domain over respective one or more distinct subsets of HARQ-ACK information bits in the second set of HARQ-ACK information bits to obtain the third set of HARQ-ACK information bits.

* * * * *